United States Patent [19]

Steinke et al.

[11] E Re. 31,425

[45] Reissued Oct. 25, 1983

[54] RESEALABLE CONTAINER

[75] Inventors: John J. Steinke, Whitehouse Station; George Kaufman, North Brunswick, both of N.J.

[73] Assignee: Church & Dwight Co., Inc., Piscataway, N.J.

[21] Appl. No.: 400,865

[22] Filed: Jul. 22, 1982

Related U.S. Patent Documents

Reissue of:

[64] Patent No.: 4,308,956
Issued: Jan. 5, 1982
Appl. No.: 94,195
Filed: Nov. 14, 1979

[51] Int. Cl.[3] ..... B43M 7/00; B65D 5/70; B65D 5/72

[52] U.S. Cl. ..... 206/611; 229/7 R; 229/17 R

[58] Field of Search ..... 229/7 R, 17 R; 206/611, 206/621, 622, 624, 625

[56] References Cited

U.S. PATENT DOCUMENTS 2,470,388 5/1949 Ball ..... 206/611
2,593,019 4/1952 Glaser ..... 229/17 R

*Primary Examiner*—George T. Hall
*Attorney, Agent, or Firm*—Hammond & Littell, Weissenberger and Muserlian

[57] ABSTRACT

A three-dimensional resealable container comprising a top portion, a bottom portion and at least one side portion, the top portion being comprised of an inner section with die-cut portion and an outer section provided with a hinged flap portion adapted to open and close the container with the die-cut portion secured to the hinged flap, which container is useful for dispensing particulate or powdered material.

8 Claims, 4 Drawing Figures

RESEALABLE CONTAINER

Matter enclosed in heavy brackets [ ] appears in the original patent but forms no part of this reissue specification; matter printed in italics indicates the additions made by reissue.

BACKGROUND OF THE INVENTION

Box-like containers or cartons for powder or other pulverized materials are well known. For example, U.S. Pat. No. 1,709,840 relates to powder boxes formed from pasteboard and the like. Box-like containers or cartons having perforations or other openings to dispense the contents therein are also known. U.S. Pat. Nos. 742,271 and 939,825 disclose folded-blank paper boxes capable of being used as a shaker to dispense pepper or other spices or pulverized material. In U.S. Pat. No. 1,303,138 a similar box having a liftable flap is described. However, although the flap is intended to reseal the box after use, the flap does not in fact function well in the capacity.

OBJECTS OF THE INVENTION

It is an object of this invention to provide an improved container for powdered or other particulate materials.

It is also an object of this invention to provide a resealable shaker container for powder or other pulverized materials.

These and other objects and advantages of the invention will become obvious from the following detailed description.

THE INVENTION

The novel three-dimensional, resealable container of the invention comprises a top portion, a bottom portion and at least one side portion, the top portion being comprised of an inner section with die-cut portion and an outer section provided with a hinged flap portion adapted to open and close the container with the die-cut portion secured to the hinged flap. The container may have any desired shape such as cylindrical, cubic, rectangular, etc.

The container of the invention can be resealed after opening due to the frictional contact of the hinged flap with the top and with the die-cut section of the inner section of the top secured to the outer section of the top which results in improved tightness of the hinged flap to avoid accidental opening. In a preferred embodiment of the invention, the leading edge of the hinged flap extends to the edge of the top portion or protrudes slightly beyond the edge for easy gripping. The die-cut section may be of any configuration but is preferably circular.

The container may be made of any suitable material, including cardboard, pasteboard, kraft, newsback board, solid bleached sulfate, and the like. It is within the scope of the invention that certain polymeric materials capable of being scored, folded, and die-cut, may be used, such as for example, polyethylene. The useful materials may be wax-coated, on one or both sides of the blank.

The container of this invention is useful for storing and dispensing virtually any powder or other material puliverizable to a size small enough to pass through the openings or perforations in the top. Typical of such dispensible materials are pepper, salt, sugar, other spices, talc, sodium bicarbonate, cleanser, and the like.

The resealable container of this invention may be any sided shape, according to the horizontal cross-section, including triangular, square, rectangular, pentagonal octagonal, etc. Rectangular and square shapes are preferred and square shapes are especially preferred.

A preferred three-dimensional container of the invention is comprised of a single blank of material cut and scored to form the sides, bottom, and top of the carton when folded to position, the top of said carton comprising two sections on opposite sides of the top adapted to lap one another, both sections formed with registered openings or perforations, preferrably the other two sections adapted to fold at right angles over said first sections, the first of the two latter sections having a die-cut piece centrally registered with the openings or perforations of the first named sections and the second of the two latter sections having a hinged flap adapted to cover and close said openings or perforation, the die-cut piece being affixed to said hinged flap.

In this embodiment, it is preferred to provide one of the two sections lapping one another with an embossed recess about the overlapping portion of the section which increases the spring action of the flaps creating an internal pressure which aids in the sealing.

Another preferred modification of the container is comprised of a single blank of material cut and scored to form the sides, bottom, and top of the carton when folded to position, the top of said carton comprising two sections on opposite sides of the top adapted to reciprocally fit with one another, one of which sections is being formed with registered openings or perforations, the other two sections adapted to fold at right angles over the said first sections, the first of the two latter sections having a die-cut piece centrally registered with the openings or perforations of the first named sections and the second of the two latter sections having a flap adapted to cover and close said openings or perforations, the die-cut being affixed to said hinged flap.

Referring now to the drawings.

Figures 1, 2, 3, 4:
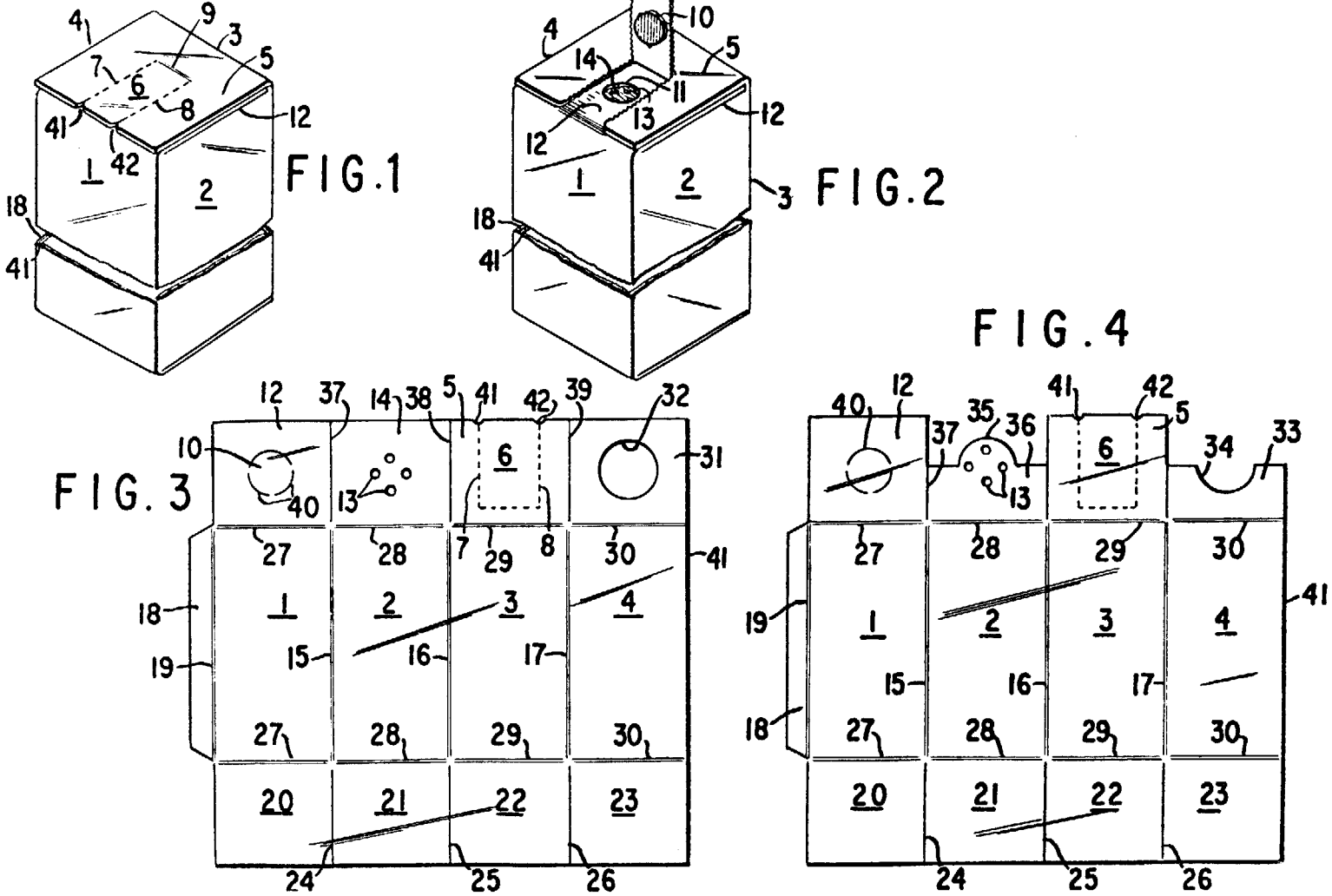
FIG. 1 is a perspective view of one embodiment of the invention wherein the hinged flap is even with the top surface of the container.
FIG. 2 is a perspective view similar to FIG. 1 wherein the flap is raised.
FIG. 3 shows a blank representing an embodiment of the invention as the blank is cut and creased preparatory to folding.
FIG. 4 shows a blank representing a different embodiment of the invention as the blank is cut and creased preparatory to folding.

The embodiment of this invention shown in FIG. 1 has side walls 1 and 2, shown, as well as side walls 3 and 4, not shown. Top section 5 contains hinged flap 6, which is formed by die-cut, perforated lines 7 and 8 and is hinged at score line 9.

FIG. 2 shows the embodiment of FIG. 1 with hinged flap 6 in a raised position. Die-cut piece 10, which is affixed or glued to the underside of hinged flap 6, was cut from, and fits snugly into, opening 11 in section 12. Visible through opening 11 are perforations or openings 13 in section 14.

FIGS. 3 and 4 each represent a blank from which the resealable shaker carton can be prepared. In FIG. 3, side walls 1,2,3, and 4 are formed by score lines 15,16 and 17, and tab 18 is formed by score line 19. Bottom sections or flaps 20,21,22 and 23 are separated by die-cut lines 24,25 and 26 and are formed by score lines 27,28,29 and 30.

The top sections or flaps of FIGS. 3 and 4 represent two different embodiments of the invention. In FIG. 3, flap 31 has an opening 32 which registers centrally with the perforations 13 and piece 10. In FIG. 4, flap 33 has an indentation or boundary 34 intended to reciprocally fit boundary 35 on flap 36.

Flaps 33 and 36 can also have other, reciprocally fitting shapes. For example, boundaries 34 and 35 could each be a straight line, the respective dimensions of flaps 33 and 36 being such that they would not overlap but would fold on the same plane.

The top sections are separated from one another by die-cut lines 37,38 and 39. Piece 10 is formed by die-cut, perforated line 40. Section 5 has notches 41 and 42 to facilitate the grasping and raising of hinged flap 6.

In forming containers of this invention, tab 18 is affixed or glued to the interior surface of section 4 so that lines 19 and 41 abut. Then, the bottom flaps 20 to 23 may be folded in turn to form a bottom surface. These flaps may be held in position with glue or staples, or the like. It is within the scope of the invention that two of the bottom flaps, such as 21 and 23 or 20 and 22, may be truncated so that they "fit" together on the same plane.

The top sections should be folded so that section 31 is folded first, then section 14, followed by section 12 and section 5. Each of sections 14, 12 or 5 should be glued or affixed, on the lateral edges to the preceding surface. In particular, section 5 should be affixed to section 13 by glue outwardly adjacent to the die-cut lines and piece 10 should be affixed to the undersurface of hinged flap 6.

To open the containers of this invention, the outside portion of hinged flap 6 is grasped and pulled up so that perforated lines 7 and 8 tear and piece 10 is removed from section 12 to form opening 11. After use, hinged flap 6 is pressed down to cause piece 10 to fit snugly into opening 11 and section 12.

The perforation or openings 13 can comprise circular holes or slits wide enough to permit the passage of the pulverized material within. Typically, perforations 13 could comprise four evenly spaced circular holes, each of which has a diameter of from 0.05 to 0.125 inches.

Various modifications of the invention may be made without departing from the spirit or scope thereof and it is to be understood that the invention is to be limited only as defined in the appended claims.

We claim:

1. A three-dimensional resealable container with a square or rectangular cross-section comprising a top portion, a bottom portion and 4 side portions, the top portion being formed by a hinged flap of each side portion adapted to lap one another, the inner-most flap being provided with a centrally registered opening, the second inner-most flap being provided with a centrally registered portion with holes or performations therein, the second outer-most flap being provided with a centrally registered die-cut piece secured to the outer-most flap and the outer-most flap being provided with a hinged flap portion to open and close the container with the die-cut portion secured to the hinged flap.

2. A container of claim 1 wherein the leading edge of the hinged flap extends to the edge of the top portion.

3. A container of claim 1 wherein the cross-section is square.

4. A three-dimensional container with a square or rectangular cross-section comprising a top portion, a bottom portion and 4 side portions, the top portion being formed by a hinged flap of each side portion and adapted to lap one another, the inner-most flap extending one half across the cross-section of the container and provided with a centrally registered opening, the second inner-most flap extending one half across the cross-section of the container and is provided with a tab portion overlapping the inner-most flap and provided with centrally registered holes or perforations, the second outermost flap being provided with a centrally registered die-cut piece secured to the outer-most flap and the outer-most flap being provided with a hinged flap portion to open and close the container with the die-cut portion secured to the hinged flap.

5. The container of claim 4 wherein the inner-most flap is provided about the opening with an embossed recess to accommodate the overlapping second inner-most section.

6. The container of claim 4 wherein the cross-section is square.

7. The container of claim 4 wherein the cross-section is rectangular.

8. A three-dimensional container with a square or rectangular cross-section comprising a top portion, a bottom portion and 4 side portions, the top portion being formed by a hinged flap of each side portion and adapted to lap one another, [the inner-most flap being provided with a centrally registered opening,] the second inner-most flap being provided with a centrally registered opening, the second outer-most flap being provided with a [centrally] registered die-cut piece secured to the outer-most flap and the outer-most flap being provided with a hinged flap portion to open and close the container with the die-cut portion secured to the hinged flap.

* * * * *